United States Patent [19]

Axelrod et al.

[11] Patent Number: 4,849,884

[45] Date of Patent: Jul. 18, 1989

[54] MAILING AND ACCOUNTING SYSTEM

[75] Inventors: Barry H. Axelrod, Newtown; Robert T. Durst, Jr., Monroe, both of Conn.

[73] Assignee: Pitney Bowes Inc., Stamford, Conn.

[21] Appl. No.: 904,528

[22] Filed: Sep. 5, 1986

[51] Int. Cl.⁴ .............................................. G06F 15/30
[52] U.S. Cl. ................................ 364/406; 364/464.02
[58] Field of Search ............ 364/464, 466, 406, 464.02

[56] References Cited

U.S. PATENT DOCUMENTS

| | | | |
|---|---|---|---|
| 3,922,965 | 12/1975 | Platt | 101/93.16 X |
| 4,178,847 | 12/1979 | Erhardt | 101/91 |
| 4,319,328 | 3/1982 | Eggert | 364/466 |
| 4,403,301 | 9/1983 | Fessel | 364/406 |
| 4,420,819 | 12/1983 | Price | 364/466 X |
| 4,511,793 | 4/1985 | Racanelli | 364/466 X |
| 4,574,352 | 3/1986 | Coppola | 364/466 |
| 4,585,220 | 4/1986 | Zemke | 364/471 X |
| 4,623,965 | 11/1986 | Wing | 364/406 X |
| 4,639,873 | 1/1987 | Buggarly | 364/466 |
| 4,673,802 | 6/1987 | Ohmae | 364/406 X |

OTHER PUBLICATIONS

Bulk Business Mail–U.S. Postal Service MSC Northern Virginia, pp. 1–10.

Primary Examiner—Jerry Smith
Assistant Examiner—Steven G. Kibby
Attorney, Agent, or Firm—Peter Vrahotes; Melvin J. Scolnick; David E. Pitchenik

[57] ABSTRACT

A system for mailing bulk mail pieces in which credit rating is relied upon instead of security to assure payment of the mail. A mailer user sends a batch of mail to the post office which is accompanied by a statement sheet indicating the number of mail pieces and amount of postage due. Accompanying this statement is a check in the amount of the postage required for the batch of mail.

7 Claims, 2 Drawing Sheets

```
CUSTOMER'S NUMBER & NAME

T.A. NO. ____   PIECE COUNT        POSTAGE AMOUNT
DATE ____       SUB-LOC. *1 ____    SUB-LOC. *1 ____
BATCH NOS. ___  SUB-LOC. *2 ____    SUB-LOC. *2 ____
                SUB-LOC. *3 ____    SUB-LOC. *3 ____
                TOTAL PC. CT. ____  TOTAL POSTAGE ____

CHECK NO. ____
- - - - - - - - - - - - - - - - - - - - - - - - - -
MAILER'S                            CHECK NO. ____
NAME & ADDRESS
                                    ____ 19 ____

PAY TO THE ORDER OF _____ $ ____
_____ DOLLARS

BANK'S  NAME                        _____
                                    MAILER'S SIGNATURE

_____
BATCH NOS. _____                   AGENT'S SIGNATURE
```

```
ADDRESSOR                        US POSTAGE
                                 FIRST CLASS
                                  - PAID -
                           48    CHECK NUMBER

22¢ 101886 * C2J2743T56
        JOHN J. DOE
        TAIL SPIN ROAD
        WAXTON CT. 06999-1234
```

MAILING AND ACCOUNTING SYSTEM

BACKGROUND OF THE INVENTION

At the turn of the century a great deal of effort was directed to developing and establishing a postage meter mailing system. This required approval of each country in which a postage meter mailing system was to be used whereby the post offices within each country would accept a postage indicia as proof of postage payment as was the case with postage stamps. Among the first countries to accept and work with a postage meter system were Norway and New Zealand. Subsequently, the use of postage meters for the purpose of paying for postage became universally accepted.

One of the reasons for the development of the postage meter was to prevent the stealing of stamps. More specifically, individuals working for various mailers would simply take the stamps for their own use. By having a postage meter, the mailer stopped the pilfering of stamps and obtained a faster and more convenient way of processing his mail. With the wide spread use of postage meters came the problem of assuring that a mailer was paying for the postage and for this reason postage meters were built in such a way as to provide a high degree of security. Postage meters are sealed devices that can only be opened by an authorized individual and measures are taken in the design and manufacture of postage meters to assure that the print head can not be "wiped" so as to obtain an unauthorized postage indicia. More specifically, a mail piece cannot be placed in contact with a print head until the printing of postage is accounted for. In addition to provide a high degree of security, when a postage meter was to be charged, i.e., provided funds for the payment of postage, a mailer was required to bring the metering portion of his postage meter machine to a post office. At the post office, the mailer would buy a quantity of postage and the postage meter would be charged that amount by a postal authority. More specifically, the descending register of the postage meter would be increased in value to store the amount of postage a mailer had at his disposal.

More recently with the advent of electronic postage meters, a scheme has been devised whereby a mailer may charge his postage meter remotely. This scheme involves communication over the telephone lines with a central station whereby the mail user would have his postage meter, or descending register, increased in value so that the mailer could process his mail.

Although the postage meter system has worked quite well throughout the years, certain shortcomings have been experienced in the processing of large quantities of mail. Where large quantities of mail are to be sent, a difficulty has arisen in that postage meters are wearing out relatively rapidly. Because of the security involved with the postage meter, they obviously are relatively expensive items and it would be advantageous if one were able to process large quantities of mail without having to be concerned about replacement of postage meters frequently. Furthermore, it would be advantageous to be able to mail large quantities of mail without having to deal with the security measures practiced previously.

SUMMARY OF THE INVENTION

An accounting and mailing system has been devised whereby a mailer's credit rating is relied upon to have mail verified rather than requiring that the mailer pay for postage in advance. The mailer makes arrangements with a bank or ageny whereby he is granted the right to draw checks upon that bank of agency. In sending a batch of mail to a post office, the mailer will not only send a statement that incorporates all the parameters relative to that mail batch, i.e., number of mail pieces, class of mail, postage due, weight of the individual mail pieces and the like, he will also send a check for payment of the postage required for the mail pieces. The individual mail pieces will have little or no evidence of postage payment.

BRIEF DESCRIPTION OF THE DRAWINGS

FIG. 2 is a representative of a statement sheet to which a check is attached; and FIG. 3 is a representative mail piece showing the information contained on the face thereof.

DETAILED DESCRIPTION OF THE PREFERRED EMBODIMENT

Figure 1:
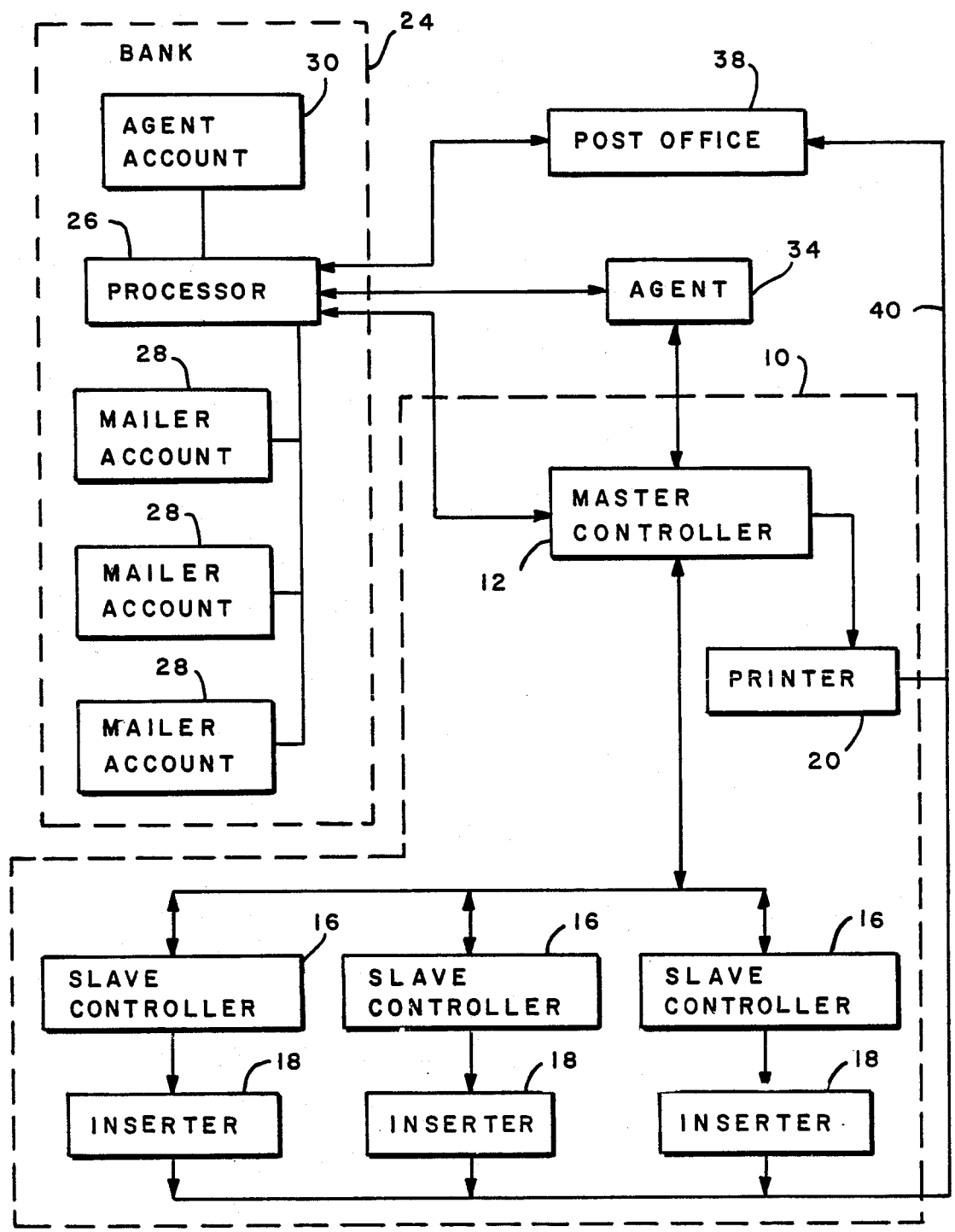
FIG. 1 shows a block diagram of a accounting and mailing system in which the instant invention may be practiced.

The mailing and accounting system shown in FIG. 1. includes a mailer location 10 that has a master controller 12. This master controller 12 may be any form of processor that includes a keyboard for input and a CRT for display, as well as memory and logic components. Preferably, the master controller 12 would be a secure unit having the basic attributes of a postage meter without a printer. This master controller 12 is connected to a number of slave controllers 16, each of which is preferably an unsecured processor. Each slave controller 16 is in communication with an inserter 18. The inserter 18 may be any of a number of commercially available inserters that are capable of placing inserts into an envelope. These envelopes may be windowed envelopes whereby the first, or exposed, insert contains the address information or the inserter may have a printer whereby the address is printed on the face of the envelope. Examples of inserters that may be used include Pitney Bowes inserter model series number 3100. The master controller is also in communication with a server printer 20.

The mailer 10 communicates with a bank 24 by having the master controller 12 communicate with a processor 26 within the bank. The bank 24 contains various customer mailer accounts 28, as well as an account 30 of an agent. Although these are shown as separate blocks that are in communication with the processor 26, it will be appreciated that this is done for illustration only and each of these accounts 28, 30 is a memory cell located within the permanent memory of the processor 26.

In addition to communication with the bank 24, the master controller 12 is in communication with an agent location 34. This agent location 34 will be a company or individual who is responsible for payment of the postage required for the mail of the mailer 10. The agent location 34 would include a processor equipped with a keyboard for input and a CRT for display as well as other normal components such as memory, logic and the like. The agent location 34 is also in communication with the processor 26 of the bank.

Also in communication with the bank 24 is a post office 38 to which the mailer would send his batches of mail as indicated by the line 40 and to which the agent 34 would be responsible for payment of such mail.

Referring now to FIG. 2 a statement sheet 42 is shown which records the transaction, this statement sheet contains information relative to the batches of mail being sent, broken down in terms of the numbers of mail pieces having a particular weight and class, the postage due for mail in each category as well as the total amount of postage due. This statement is referred to hereinafter as a passport. Secured to the passport 42 will be a draft or negotiable instrument such as a check 44 that is drawn upon the bank 24. This check 44 includes a space for the signature of both the agent 34 and the mailer 10. Illustrated in FIG. 3 is an envelope 46. This envelope 46 will show on the face thereof information relative to postage whereby authorization of the mail may be determined. In the upper right hand corner is an indicia stating the class of mail and giving the number of the check by which postage has been paid. In the address block the first three lines give the address of the addressee and the fourth line postage information.

In operation, the master controller 12 will generate postage information whereby batches of mail may be prepared for delivery to the post office 38. Each slave controller 16 is controlled by the master controller 12 whereby postage information will be directed to a particular slave controller upon request by a slave controller. This postage information will include the authorization number and check number to be printed on envelopes 46. As a form of security, the information exchanged between the master controller 12 and the slave controller 16 may be encrypted. In this way, if there is an interception of the message, the encryption would prevent unauthorized postage taking. Each slave controller can be at different sub-locations, such as a branch or department of the mailer location 10 where the mailing information would be generated. When a batch of mail is to be processed at a given location, the mailing information in terms of addressees, addresses, class of mail and the like would be input to the slave controller 16 by the mailer, which mail information would be combined with the postage information received from the master controller 12. An inserter 18 is under the control of each slave controller 16 to process the mail and print appropriate mailing and postage information on an envelope. Upon completion of the processing of a batch of mail, mailing information will be conveyed from the particular slave controller 176 to the master controller 12 where an accounting will be made. More specifically, the slave controller 16 would inform the master controller 12 of the quantity of mail processed by its associated inserter as well as the postage required to send the batch of mail. Upon receipt of this information, the master controller 12 would account for the postage value of the batch and include the same in a passport that is subsequently printed. In this way different batches of mail from various branches or departments within the mailer location 12 may be processed. Each batch of mail from each inserter 18 will indicate the mail batch that is processed thereby. A passport 42 will be printed by the printer 20 through control of the master controller 12 and would accompany collected batches of mail generated in a given day by all the inserters 16. The passport will not only have mailing information, but also information regarding the facility within the mailers location which processed the mail.

Upon receipt of a batch of mail from the mailer 10, the postal authority will have a passport 42 that will indicate the amount of mail sent and reflect the postage that is due and a check made out to the Post Office as payee. Because of the presence of the attached check 44, the postal personnel has payment of the mail and merely has to visually ascertain its correctness.

As a consequence of this system, two parties become responsible for payment of the check, the agency and the mailer. The post office may look to either of the two for full payment and the bank 24 would be authorized to honor the check that contains the signatures of both the agent and the mailer. Such signatures may be machine printed by the printer 20. Within the bank itself, the agents account 30 would be reponsible for payment and any shortcoming therebetween will be settled on the basis of the banks relationship with the agent. If there are insufficient funds within a mailers account, this will be a matter to be settled between the agent and the mailer. In any case, the post office is assured of payment and the mailer is assured of having his mail processed by the post office.

This particular scheme becomes of great use where large and reliable, corporations wish to send mail without the need of requiring that payment accompany each batch of mail in the form of prepayment postage. By being able to sign a check, the mailer is assured of having his mail delivered without any prior authorization or certification by the post office.

Consequently, what has been shown and described is a system and method whereby large quantities of mail may be sent without need of a postage meter or like secured device printing postage indicia and without the need of encryption on the envelopes. This is scheme that relies upon the creditworthiness of the mailer and the agent 34, the business relationship of the agent 34 and the bank 34 and established banking transaction policies, practices and techniques.

Although the invention has been described as it relates to a tripartite system, it will be appreciated that the bank 24 could also act as the agent 34. The guarantee of payment by the mailer could be accomplished by the issuance of certified checks issued by the bank 24 to the mailer, which certified checks would be integrated with the passport 44 shown in FIG. 2.

What is claimed is:

1. In a mailing and accounting system for assuring the payment of postage, comprising:
    a banking unit having a first processor with means for accounting for individual mailer accounts and an agents account,
    an agent in communication with the banking unit processor,
    a controller having means for generating mail data in communication with the agent location,
    a printer in communication with said controller, means attached to said printer for supplying a statement sheet with a negotiable instrument attached thereto, and
    an inserter in communication with said controller.

2. The system of claim 1 wherein said negotiable instrument is a check.

3. In a mailing and accounting system for assuring the payment of postage, comprising:
    a banking unit having a processor and means for accounting for individual mailer accounts,
    a mailer location including a master controller in communication with the banking unit processor, and a printer in communication with said master controller, and
    means for supplying a statement sheet with a check attached thereto to said printer, a mailer sublocation having at least one slave controller in communication with said master controller and an inserter in communication with said slave controller.

4. The system of claim 3 including means for providing encrypted messages between said master controller and said slave controller.

5. The system of claim 3 wherein said banking unit includes means for accounting for an agent account and further comprising an agent location in communication with said banking unit processor and with said mailer location master controller.

6. In a method of processing and accounting for mail, the steps comprising:
   (A) establishing communication between a banking unit having a first processor with means for accounting for individual mailer accounts and a primary mailer location having a master controller in communication with the banking unit processor and a printer in communication with said master controller,
   (B) establishing communication between the primary mailer location and at least one secondary mailer location having a slave controller in contact with said master controller and an inserter having printing means.
   (C) communicating postage information from the primary mailer location to the secondary mailer location.
   (D) printing the addresses and addressees upon a plurality of mail pieces at the secondary mailer location;
   (E) determining the amount of postage required to mail the mail pieces at the secondary location;
   (F) communicating the amount of postage from the secondary mailer location to the primary mailer location;
   (G) preparing a statement at the primary mailer location having information relative to the number of mail pieces and the amount of postage required to mail the mail pieces;
   (H) sending the plurality of mail pieces, the statement and a check containing the amount of postage required to a post office and,
   (I) the master controller communicating to the banking unit the amount of said postage.

7. The method of claim 6 wherein the communication between the primary mailer location and the secondary mailer location are encrypted.

* * * * *